(12) United States Patent
Rub

(10) Patent No.: US 10,908,880 B2
(45) Date of Patent: Feb. 2, 2021

(54) AUDIO SIGNAL CIRCUIT WITH IN-PLACE BIT-REVERSAL

(71) Applicant: KNOWLES ELECTRONICS, LLC, Itasca, IL (US)

(72) Inventor: Leonardo Rub, Mountain View, CA (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 16/657,612

(22) Filed: Oct. 18, 2019

(65) Prior Publication Data

US 2020/0125334 A1  Apr. 23, 2020

Related U.S. Application Data

(60) Provisional application No. 62/747,775, filed on Oct. 19, 2018, provisional application No. 62/770,589, filed on Nov. 21, 2018.

(51) Int. Cl.

| H04M 1/00 | (2006.01) |
| H04M 9/00 | (2006.01) |
| G06F 7/76 | (2006.01) |
| G06F 16/61 | (2019.01) |
| H04R 1/08 | (2006.01) |
| G06F 17/14 | (2006.01) |
| G05B 15/02 | (2006.01) |

(52) U.S. Cl.
CPC ............. *G06F 7/768* (2013.01); *G05B 15/02* (2013.01); *G06F 16/61* (2019.01); *G06F 17/142* (2013.01); *H04R 1/08* (2013.01)

(58) Field of Classification Search
CPC ........ G06F 7/768; G06F 16/61; G06F 17/142; G05B 15/02; H04R 1/08
See application file for complete search history.

(56) References Cited

U.S. PATENT DOCUMENTS

| 5,822,598 | A | 10/1998 | Lam |
| 6,070,140 | A | 5/2000 | Tran |
| 6,112,019 | A * | 8/2000 | Chamdani ............. G06F 9/3836 |
|  |  |  | 712/214 |
| 6,154,721 | A | 11/2000 | Sonnic |
| 6,249,757 | B1 | 6/2001 | Cason |
| 6,397,186 | B1 | 5/2002 | Bush et al. |
| 6,756,700 | B2 | 6/2004 | Zeng |
| 7,415,416 | B2 | 8/2008 | Rees |
| 7,774,204 | B2 | 8/2010 | Mozer et al. |
| 7,957,972 | B2 | 6/2011 | Huang et al. |
| 8,275,148 | B2 | 9/2012 | Li et al. |
| 8,666,751 | B2 | 3/2014 | Murthi et al. |
| 8,677,081 | B1 * | 3/2014 | Wentzlaff ............ G06F 12/1081 |
|  |  |  | 711/154 |

(Continued)

*Primary Examiner* — Simon King
(74) *Attorney, Agent, or Firm* — Foley & Lardner LLP

(57) ABSTRACT

An integrated circuit for processing audio signals from a microphone assembly, combinations thereof and methods therefor, including a multi-issue processor configured to execute multiple instructions concurrently and connectable to a memory with a plurality of locations each represented by a corresponding index. Bit-reversal is performed on a sequence of audio data bits stored in memory by concurrently performing a load or store operation related to a first index and determining whether to perform a load operation for a second index.

20 Claims, 8 Drawing Sheets

(56) References Cited

U.S. PATENT DOCUMENTS

| | | |
|---|---|---|
| 8,972,252 B2 | 3/2015 | Hung et al. |
| 8,996,381 B2 | 3/2015 | Mozer et al. |
| 9,043,211 B2 | 5/2015 | Haiut et al. |
| 9,112,984 B2 | 8/2015 | Sejnoha et al. |
| 2006/0074658 A1 | 4/2006 | Chadha |
| 2008/0046683 A1* | 2/2008 | Codrescu ............. G06F 9/3885 712/7 |
| 2009/0019262 A1* | 1/2009 | Tashiro ............... G06F 9/30098 712/208 |
| 2012/0232896 A1 | 9/2012 | Taleb et al. |
| 2012/0310641 A1 | 12/2012 | Niemisto et al. |
| 2013/0086368 A1* | 4/2013 | Gschwind ............... G06F 9/384 712/226 |
| 2013/0223635 A1 | 8/2013 | Singer et al. |
| 2014/0163978 A1 | 6/2014 | Basye et al. |
| 2014/0244269 A1 | 8/2014 | Tokutake |
| 2014/0257821 A1 | 9/2014 | Adams et al. |
| 2014/0274203 A1 | 9/2014 | Ganong et al. |
| 2014/0278435 A1 | 9/2014 | Ganong et al. |
| 2014/0281628 A1 | 9/2014 | Nigam et al. |
| 2014/0343949 A1 | 11/2014 | Huang et al. |
| 2015/0067836 A1* | 3/2015 | Billa .................... G06F 21/567 726/22 |
| 2015/0106085 A1 | 4/2015 | Lindahl |
| 2015/0112690 A1 | 4/2015 | Guha et al. |
| 2015/0134331 A1 | 5/2015 | Millet et al. |

\* cited by examiner

BEFORE

| Index | 0000 | 0001 | 0010 | 0011 | 0100 | 0101 | 0110 | 0111 |
|---|---|---|---|---|---|---|---|---|
| Value | 21 | 43 | 18 | 32 | 11 | 15 | 55 | 62 |
| Index | 1000 | 1001 | 1010 | 1011 | 1100 | 1101 | 1110 | 1111 |
| Value | 47 | 29 | 44 | 33 | 27 | 51 | 38 | 48 |

AFTER

| Index | 0000 | 0001 | 0010 | 0011 | 0100 | 0101 | 0110 | 0111 |
|---|---|---|---|---|---|---|---|---|
| Value | 21 | 47 | 11 | 27 | 18 | 44 | 55 | 38 |
| Index | 1000 | 1001 | 1010 | 1011 | 1100 | 1101 | 1110 | 1111 |
| Value | 43 | 29 | 15 | 51 | 32 | 33 | 62 | 48 |

| Forward Index | Forward Index (Binary) | Reverse Index | Reverse Index (Binary) | Swap? |
|---|---|---|---|---|
| 0 | 0000 | 0 | 0000 | No |
| 1 | 0001 | 8 | 1000 | Yes |
| 2 | 0010 | 4 | 0100 | Yes |
| 3 | 0011 | 12 | 1100 | Yes |
| 4 | 0100 | 2 | 0010 | No |
| 5 | 0101 | 10 | 1010 | Yes |
| 6 | 0110 | 6 | 0110 | No |
| 7 | 0111 | 14 | 1110 | Yes |
| 8 | 1000 | 1 | 0001 | No |
| 9 | 1001 | 9 | 1001 | No |
| 10 | 1010 | 5 | 0101 | No |
| 11 | 1011 | 13 | 1101 | Yes |
| 12 | 1100 | 3 | 0011 | No |
| 13 | 1101 | 11 | 1011 | No |
| 14 | 1110 | 7 | 0111 | No |
| 15 | 1111 | 15 | 1111 | No |

| Clock Cycle | First Instruction | Second Instruction |
|---|---|---|
| Initialization | | |
| 1 | Initialize forward index A<br>Generate reverse index A<br>Generate swap enable A | No Operation (NOP) |
| Processing Loop | | |
| 2 | Load value at forward index A into forward value register | Forward index B = (forward index A) + 1<br>Generate reverse index B<br>Generate swap enable B |
| 3 | Load value at reverse index A into reverse value register | If swap enable B = 0<br>Increment forward index B<br>Generate reverse index B<br>Update swap enable B |
| 4 | If swap enable A = 1<br>Store reverse value at forward index A | If swap enable B = 0<br>Increment forward index B<br>Generate reverse index B<br>Update swap enable B |
| 5 | If swap enable A = 1<br>Store forward value at reverse index A | If swap enable B = 0<br>Increment forward index B<br>Generate reverse index B<br>Update swap enable B |
| 6 | Load value at forward index B into forward value register | Forward index A = (forward index B) + 1<br>Generate reverse index A<br>Generate swap enable A |

| Clock Cycle | First Instruction | Second Instruction |
|---|---|---|
| 7 | Load value at reverse index B into reverse value register | If swap enable A = 0<br>Increment forward index A<br>Generate reverse index A<br>Update swap enable A |
| 8 | If swap enable B = 1<br>Store reverse value at forward index B | If swap enable A = 0<br>Increment forward index A<br>Generate reverse index A<br>Update swap enable A |
| 9 | If swap enable B = 1<br>Store forward value at reverse index B | If swap enable A = 0<br>Increment forward index A<br>Generate reverse index A<br>Update swap enable A |
| 10 | Load value at forward index A into forward value register | Forward index B = (forward index A) + 1<br>Generate reverse index B<br>Generate swap enable B |
| 11 | Load value at reverse index A into reverse value register | If swap enable B = 0<br>Increment forward index B<br>Generate reverse index B<br>Update swap enable B |
| ... | ... | ... |

FIG. 5B

| Buffer Size | Prior Approach Clock Cycles | Present Methodology Clock Cycles | Speedup Factor |
| --- | --- | --- | --- |
| 16 ($n = 4$) | 47 | 24 | 1.95 |
| 32 ($n = 5$) | 98 | 48 | 2.04 |
| 64 ($n = 6$) | 241 | 120 | 2.01 |
| 128 ($n = 7$) | 486 | 232 | 2.09 |
| 256 ($n = 8$) | 1061 | 504 | 2.11 |
| 512 ($n = 9$) | 2126 | 1008 | 2.11 |
| 1024 ($n = 10$) | 4429 | 2096 | 2.11 |
| 2048 ($n = 11$) | 8862 | 4192 | 2.11 |
| 4096 ($n = 12$) | 18077 | 8544 | 2.12 |

FIG. 6

AUDIO SIGNAL CIRCUIT WITH IN-PLACE BIT-REVERSAL

CROSS-REFERENCE TO RELATED PATENT APPLICATIONS

This application claims the benefit of and priority to U.S. Provisional Patent Application No. 62/770,589 filed Nov. 21, 2018, and also claims the benefit of and priority to U.S. Provisional Patent Application No. 62/747,775 filed Oct. 19, 2018, the entire contents of each of which are incorporated by reference herein.

FIELD OF THE DISCLOSURE

The present disclosure relates generally to digital audio signal processing and more particularly to in-place bit reversal in electrical circuits for use in microphone assemblies, combinations thereof and methods.

BACKGROUND

The processing of digital audio signals obtained from a microphone is known generally. Some such signals are obtained from a microelectromechanical systems (MEMS) microphone including a MEMS transducer and an electrical circuit disposed in a housing having a sound port and host device interface among other microphones.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 3 shows an example input data buffer before and after the data is rearranged in bit-reverse order.

FIG. 4 shows an example of index swapping that occurs during a bit-reverse permutation.

FIGS. 5A-5B show an efficient method for an in-place bit-reverse permutation.

FIG. 6 is a table that demonstrates advantages of the method of FIGS. 5A-5B when compared to alternative approaches.

DETAILED DESCRIPTION

Figure 1:
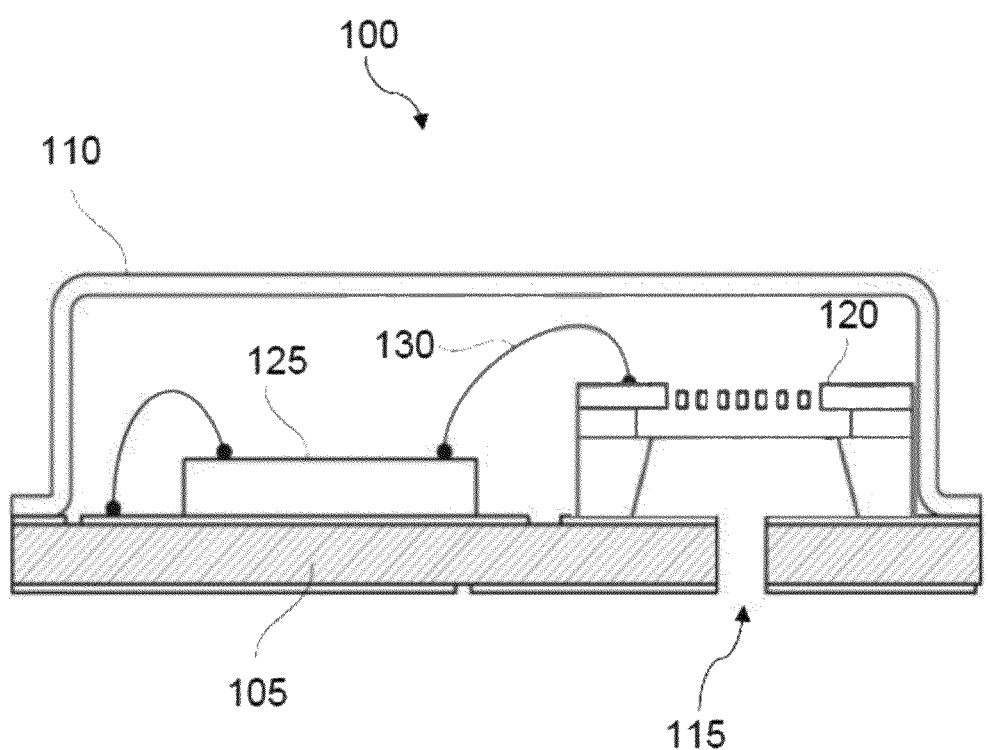
FIG. 1 is a drawing of an example microphone assembly.

Turning now to FIG. 1, an example implementation of a microphone assembly 100 is shown, according to some embodiments. Microphone assembly 100 can be a surface-mount component for use in a variety of electronic devices such as smart phones, laptops, and tablets. Microphone assembly 100 includes a MEMS transducer 120 that is configured to convert acoustic energy into an electrical output and an integrated circuit 125 that is configured to process electrical signals output from transducer 120. Microphone 100 is also shown to include a substrate 105 (e.g., base, printed circuit board) on which MEMS transducer 120 and integrated circuit 125 are mounted. Substrate 105 can include any number of insulating layers, metal layers, and connection pads/paths. For example, processed audio signals can be provided to a host device (e.g., smart phone, laptop) via one or more connection pads on the bottom of substrate 105.

In some embodiments, MEMS transducer 120 is a capacitive transducer. For example, MEMS transducer 120 can include two or more electrodes, at least one of which is movable in the presence of sound pressure to vary the capacitance. Other transducers may be embodied as a piezo-electric device. In some embodiments, transducer 120 is connected to integrated circuit 125 via wire bonds 130. Electrical signals output from transducer 120 can be sent to integrated circuit 125 for processing, such as to generate an output signal representative of the sensed acoustic activity. For example, processing via integrated circuit 125 can include filtering, buffering, amplification, analog-to-digital conversion, digital-to-analog conversion, quantization, decimation, phase shifting, etc. Microphone 100 is also shown to include a cover 110 that is coupled to substrate 105. Substrate 105 and cover 110 form a housing or packaging that encloses and protects transducer 120 and integrated circuit 125. In the illustrated bottom port embodiment, a back volume of transducer 120 is defined between transducer 120 and the housing. In some embodiments, cover 110 comprises a metal material that provides radio-frequency protection and other noise reduction capabilities.

Microphone 100 is an example of a bottom port configuration. As shown, sound energy travels through an acoustic port 115 that is formed in substrate 105. The configuration shown is intended to be exemplary and variations thereof are contemplated within the scope of the present disclosure. For example, MEMS transducer 120 could be a dual motor transducer, integrated circuit 125 could be embedded in the substrate, and/or one more sensors (e.g., pressure sensors, temperature sensors, etc.) could be included in various configurations not shown in FIG. 1. Further, an ingress protection element could be disposed over port 115 and/or port 115 could be formed in cover 110 instead of substrate 105.

Figure 2:
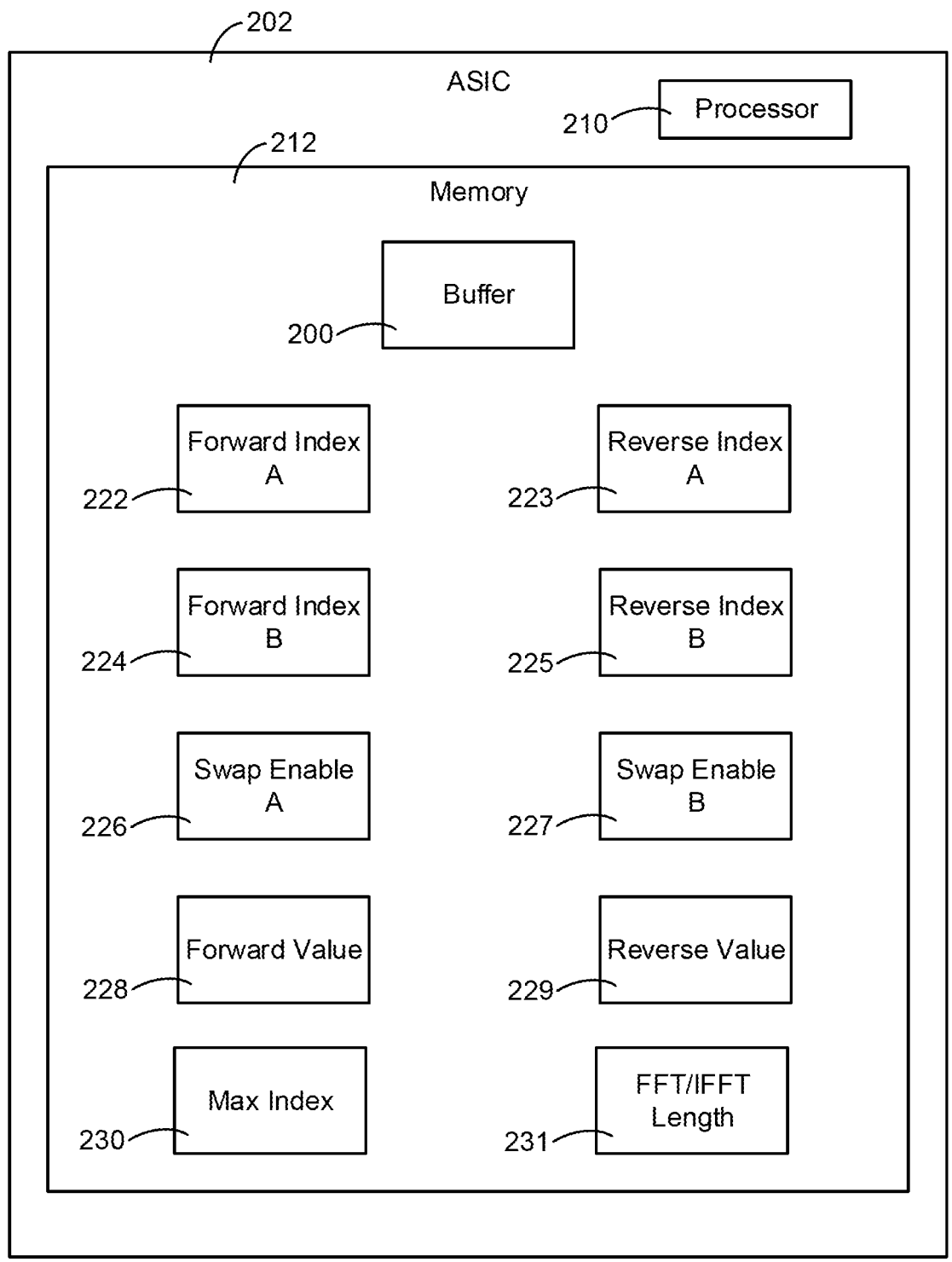
FIG. 2 is a block diagram of an application-specific integrated circuit (ASIC) associated with the microphone assembly of FIG. 1.

FIG. 2 is a block diagram showing an integrated circuit 202, according to some embodiments. Integrated circuit 202 could be disposed in the housing of microphone assembly 100 (e.g., integrated circuit 125) or it could be coupled to an output of one or more microphone assemblies of the type shown in FIG. 1, for example as part of a host device. Thus, integrated circuit 202 may be embodied as an application-specific integrated circuit (ASIC) configured to process audio signals generated by one or more transducers. ASIC 202 is shown to include a processor 210 and a memory 220. The integrated circuit may include a processor and a memory on one common die or the processor and memory may be fabricated on separate dies. Processor 210 is a multi-issue processor configured to execute at least two instructions concurrently. It will be appreciated that processor 210 may execute instructions at varying levels of instructions per clock cycle. In some embodiments, processor 210 is a dual-issue processor configured to execute two instructions concurrently; however, it should be understood that the present disclosure is not limited to dual-issue processors. In some implementations, ASIC 202 may be used to perform operations that utilize bit-reversal. For example, some operations performed by the ASIC as part of processing the data representative of the sensed acoustic activity may involve performing fast Fourier transform (FFT) or inverse fast Fourier transform (IFFT) calculations.

In FIG. 2, memory 220 can include registers, buffers, and a main memory (e.g., RAM). Data in the registers can be accessed quickly by processor 210 and data can be stored temporarily in the buffers. Memory can also include other parts such as caches and/or a secondary memory that is not directly connected to processor as the main memory is. It will be appreciated that the ASIC can be implemented using a variety of architectures. Moreover, the components of memory 220 shown in FIG. 2 are not intended to be exhaustive and can also be implemented in a variety of ways.

Memory 220 is shown to include an input data buffer 200. Buffer 200 can be configured to store input data associated with an audio signal generated by one or more transducers. In some embodiments, buffer 200 holds sixteen data values that can each be associated to an index. The indices can be expressed in binary from 0000 to 1111 or in decimal from 0 to 15. In order to perform FFT and/or IFFT calculations, the data in buffer 200 can be rearranged in bit-reverse order. The systems and methods described herein provide an efficient method to perform such a bit-reversal in-place (i.e., no additional buffers are used). While the present disclosure provides methods for performing bit-reversal in place using a single buffer, it should be appreciated that the techniques of the present disclosure could also be used to perform bit-reversal using multiple buffers. Likewise, a single buffer could be split (e.g., in half), and the methodology described herein could be used to perform multiple bit-reversals using a single buffer, or a single bit-reversal could be split into two or more parts using a single buffer. Processor 210 includes a load-store unit configured to execute load and store instructions such that the load-store unit loads data from buffer 200 into registers and stores data from registers back to buffer 200. In some embodiments, processor 210 includes only this single load-store unit such that only one load or store instruction can be executed at a time.

Memory 220 is also shown to include a forward index A 222, a reverse index A 223, a forward index B 224, a reverse index B 225, a swap enable A 226, a swap enable B 227, a forward value 228, a reverse value 229, a max index 230, and an FFT/IFFT length 231. The purpose of each of these components will become apparent throughout the disclosure, especially with respect to FIGS. 5A-5B described below. Each of these indices and values can be stored in registers of memory 220 and are updated throughout a bit-reverse process associated with buffer 200.

Forward index A 222 and forward index B 224 can be used to represent an index of buffer 200 being analyzed by processor 210 during the bit-reverse process. Processor 210 uses one of these indices to perform a swap while concurrently using the other index to look ahead and determine the next index of buffer 200 that requires a swap to complete the bit-reverse process. Reverse index A 223 and reverse index B 225 can be used by processor 210 to represent a bit-reverse counterpart of forward index A 222 and forward index B 224, respectively. Processor 210 can be configured to determine that a swap needs to be performed for a given index pair (forward index A 222 and reverse index A 223 or forward index B 224 and reverse index B 225) if a value (e.g., a decimal value) associated with the forward index is less than a value associated with its bit-reverse counterpart. For example, if the forward index is 0010, then the bit-reverse counterpart is 0100, and processor 210 determines that a swap is needed because the value 2 is less than the value 4. However, if the forward index is 1010, then the bit-reverse counterpart is 0101, and processor 210 determines that a swap is not needed because the value 10 is greater than the value 5. Processor 210 can be configured to set swap enable A 226 or swap enable B 227 (e.g., bits) to 1 if a swap is needed for a given forward/reverse index pair and set swap enable 226 or swap enable 227 to 0 if a swap is not needed. It will be appreciated that the comparison of the forward index and the reverse index could be reversed (i.e. check if forward index is greater than reverse index, and reverse associated operations) if desired. The same comparison should (greater than or less than) should be used throughout the bit-reverse process.

Forward value register 228 and reverse value register 229 can be used as temporary storage for data loaded from buffer 200 during the bit-reverse process. For example, if processor 210 determines that a swap is needed for a given index pair, processor 210 can execute a first load instruction to load the value in buffer 200 at the forward index (index 222 or 224) into forward value register 228 and execute a second load instruction to load the value in buffer 200 at the reverse index (index 223 or 225) into reverse value register 229. Next, processor 210 can be configured to execute a first store instruction to store the value in forward value register 228 in buffer 200 at the reverse index and a second store instruction to store the value in reverse register 229 in buffer 200 at the forward index, thereby completing a swap for the given index pair.

Processor 210 can use max index 230 and FFT/IFFT length 231 during the bit-reverse process as variables to ensure that generated indices are within a specified range and that bit-reverse counterparts are generated in proper fashion for an FFT/IFFT calculation. For example, if buffer 200 holds 16 values, then max index 230 can be set to 15 (1111). FFT/IFFT length 231, for example, can be set to $\log_2(N)-1$, where N is the length of the FFT/IFFT. Max index 230 can be set to lower values to terminate swapping earlier and save additional clock cycles. For example, if buffer 200 holds 16 values, then max index 230 can be set to the value 11 (1011) because no swapping can occur after that index.

It will be appreciated that forward index A 222, reverse index A 223, forward index B 224, reverse index B 225, swap enable A 226, swap enable B 227, forward value 228, reverse value 229, max index 230, and FFT/IFFT length 231 can be implemented in a variety of ways within depending on the desired footprint and specific hardware environment. For example, if each index of buffer 200 can be represented using four bits, then indices 222, 223, 224, and 225 can be contained in a single 16-bit register.

Turning now to FIG. 3, one example of buffer 200 contents before and after a bit-reverse operation is performed is shown, according to some embodiments. In this case, buffer 200 stores sixteen data values each represented by a four bit index. FIG. 3 serves as an example of input data buffer 200 that will be referenced in more detail below.

Turning now to FIG. 4, an example of index comparison used in a bit-reverse process associated with buffer 200 is shown, according to some embodiments. Similar to FIG. 3, table 400 shows an example where buffer 200 stores sixteen data values each represented by a four bit index. The first and second columns of table 400 show a forward index (analogous to indices 222 and 224) and the third and fourth columns of table 400 show the bit-reverse counterpart of the forward index (analogous to indices 223 and 225). The fifth column of table 400 shows whether a swap is needed for each index pair (analogous to swap enables 226 and 227).

Table 400 serves as a reference to supplement the description below with respect to FIGS. 5A-5B.

Turning now to FIGS. 5A-5B, a table illustrating an in-place bit-reverse process 500 is shown, according to some embodiments. Process 500 is performed by ASIC 202 in order to reverse the contents of buffer 200 without using any other buffers. Process 500 is part of a larger signal processing process that generally comprises converting an input signal (e.g., audio) into an output signal (e.g., microphone output). This larger process can include analog-to-digital conversion, digital-to-analog conversion, filtering, fast Fourier transform (FFT) calculations, and inverse fast Fourier transform (IFFT) calculations, for example. When performing a power of two length ($2^N$) FFT or IFFT calculation, a stream of digital data (i.e., a sequence of bits) can be reversed in-place with minimal processing and hardware requirements using process 500.

As illustrated in FIGS. 5A-5B, processor 210 is a dual-issue processor configured to execute two instructions concurrently. Accordingly, each row of the table is shown to include a first instruction, a second instruction, and an associated clock cycle. As mentioned above, it will be appreciated that processor 210 may execute instructions at varying levels of clock cycles per instruction. For the remainder of the disclosure, an example implementation in which processor 210 executes instructions at a rate of one instruction per clock cycle will be described. FIGS. 5A-5B only depict the first eleven clock cycles of process 500, however the remainder of clock cycles associated with process 500 can be inferred in view of these first eleven clock cycles. For a given clock cycle, the first instruction generally involves performing a load or store and the second instruction generally involves determining the next index of buffer 200 that requires swapping.

As shown in FIG. 5A, the first clock cycle is used for initialization (or setup). The first clock cycle of process 500 includes initializing forward index A 222, generating reverse index A 223, and generating swap enable A 226. During the first clock cycle, processor 210 can be configured to initialize index 222 to 0001 (the second index of buffer 200). Index 222 can be initialized to any value, however the example description of process 500 below assumes that index 222 is initialized to 0001. Processor 210 can then generate index 223 (also 1000) from index 222 and generate swap enable 226 based on a comparison of index 222 and index 223. In this cycle, index 222 is less than index 223 (1<8), so processor 210 sets swap enable 226 to 1. This cycle is analogous to the second row of table 400, wherein a swap is performed for the second index of buffer 200. During the first clock cycle, processor 210 may not execute a second instruction related to process 500 in parallel with the initialization of index 222, index 223, and swap enable 226 as indicated in FIG. 5A (no operation). As mentioned, it will be appreciated that any index value may be used as a starting point depending on the specific application of process 500. For example, a high index such as 1111 may be used as a starting point, or a middle index such as 0111 may be used as a starting point. A middle index may be a useful starting point in implementations where a single buffer is used to perform multiple bit-reversals.

During the second clock cycle of process 500, processor 210 loads the value stored in buffer 200 at index 222 into forward value register 228. This load instruction can be executed by the load-store unit of processor 210, for example. In this case, index 222 is set to 0001, so processor 210 loads the value 43 into register 228 (referring to the example of FIG. 3 for the value 43). In the second instruction, processor 210 calculates forward index B 224, reverse index B 225, and swap enable B 227 based on index 222 as generated during the first clock cycle. Processor 210 sets index 224 to the value of index 222+1. In this case, continuing with the above example, processor 210 sets index 224 to 0010, the third index of buffer 200. Processor 210 then generates index 225 based on index 224 (0100) and sets swap enable 227. In this case, swap enable 227 is set to 1 since index 224 is less than index 225 (2<4). This step is analogous to the third row of table 400, wherein a swap is performed for the third index of buffer 200.

Next, during the third clock cycle of process 500, processor 210 is configured to load the value stored in buffer 200 at index 223 into reverse value register 229. This load instruction can again be executed by the load-store unit of processor 210. In this case, index 223 is set to 1000, so processor 210 loads the value 47 into register 229. Concurrently, if swap enable 227 is 0, processor 210 is configured to increment index 224, generate index 225 based on index 224, and update swap enable 227 accordingly. In this case, since swap enable 227 is already 1, no updates occur.

During the fourth clock cycle of process 500, if swap enable 226 is set to 1, processor 210 is configured to store the value in reverse register 229 in buffer 200 at forward index 222. This store instruction can also be executed by the load-store unit of processor 210. In this case, during the fourth clock cycle, swap enable 226 is indeed set to 1, so processor 210 stores the value 47 in register 229 to memory at index 222 (0001) of buffer 200. This is consistent with the illustration of buffer 200 after the bit-reverse operation is complete as shown in FIG. 3. In parallel, if swap enable 227 is 0, processor 210 is configured to increment index 224, generate index 225 based on index 224, and update swap enable 227. However, in this case, swap enable 227 is set to 1, so processor 210 does not update index 224, generate index 225, or update swap enable 227.

During the fifth clock cycle of process 500, if swap enable 226 is set to 1, processor 210 is configured to store the value in forward register 228 in buffer 200 at reverse index 223. This store instruction can again be performed by the load-store unit of processor 210. In this case, since swap enable 226 is set to 1, during the fifth clock cycle, processor 210 stores the value 43 in register 228 to memory at index 223 (1000). This again is consistent with the illustration of buffer 200 after the bit-reverse operation is complete as shown in FIG. 3. In parallel, if swap enable 227 is 0, processor 210 is again configured to increment index 224, generate index 225 based on index 224, and update swap enable 227. However, in this case, swap enable 227 is still set to 1, so processor 210 does not update index 224, generate index 225, or update swap enable 227.

During the sixth clock cycle of process 500, processor 210 is configured to load the value stored in buffer 200 at index 224 (0010) into forward value register 228. In this case, processor 210 loads the value 18 into register 228. Concurrently, processor 210 is configured to set index 222 to the incremented value of index 224, generate index 223 based on index 222, and update swap enable 226 accordingly. In this case, the incremented value of index 224 is 0011, so processor 210 sets index 222 to 0011. During the sixth clock cycle, processor 210 also sets index 223 to 1100 (the bit-reverse counterpart of index 222) and sets swap enable 226 to 1 since index 222 is less than index 223 (3<12). This step is analogous to the fourth row of table 400.

Referring now to FIG. 5B, during the seventh clock cycle, processor 210 is configured to load the value stored in buffer 200 at index 225 into reverse value register 229. In this case, index 225 is set to 0100, so processor 210 loads the value 11 into register 229. Concurrently, if swap enable 226 is set to 0, processor 210 is configured to increment index 222, update index 223 based on index 222, and update swap enable 226 accordingly. In this case, since swap enable 226 is set to 1, no changes occur to these registers.

During the eighth clock cycle of process 500, if swap enable 227 is set to 1, processor 210 is configured to store the value in reverse register 229 in buffer 200 at forward index 224. In this case, processor 210 stores the value 11 at index 0010 of buffer 200. This again is consistent with the illustration of buffer 200 after the bit-reverse operation is complete as shown in FIG. 3. Concurrently, if swap enable 226 is set to 0, processor 210 is configured to increment index 222, update index 223 based on index 222, and update swap enable 226 accordingly. However, in this case, swap enable 226 is still set to 1, so processor 210 does not make any changes to these registers.

During the ninth clock cycle of process 500, if swap enable 227 is set to 1, processor 210 is configured to store the value in forward register 228 in buffer 200 at reverse index 225. In this case, processor 210 stores the value 18 at index 0100 of buffer 200. This again is consistent with the illustration of buffer 200 after the bit-reverse operation is complete as shown in FIG. 3. Concurrently, if swap enable 226 is set to 0, processor 210 is again configured to increment index 222, update index 223 based on index 222, and update swap enable 226 accordingly. However, in this case, swap enable 226 is still set to 1, so processor 210 does not increment index 222, generate index 223, or update swap enable 226.

During the tenth clock cycle of process 500, similar to the second clock cycle, processor 210 loads the value stored in buffer 200 at index 222 into forward value register 228. Now, index 222 is set to 0011, so processor 210 loads the value 32 into register 228. Concurrently, processor 210 is configured to set index 224 to the incremented value of index 222, update index 225 based on index 224, and update swap enable 227 accordingly. In this case, processor 210 sets index 224 to 0100, sets index 225 to 0010, and updates swap enable 227 to 0 since index 224 is now greater than index 225 (4>2). This step is analogous to the fifth row of table 400, wherein a swap is not performed for the fifth index of buffer 200.

During the eleventh clock cycle, similar to the third clock cycle, processor 210 loads the value stored in buffer 200 at index 223 into reverse value register 229. Now, index 223 is set to 1100, so processor 210 loads the value 27 into register 229. Concurrently, if swap enable 227 is set to 0, processor 210 is configured increment index 224, generate index 225 based on index 224, and update swap enable 227 accordingly. In this case, swap enable 227 is indeed set to 0, so processor 210 increments index 224 to 0101, sets index 225 to 1010, and updates swap enable 227 to 1 since index 224 is now less than index 225 (5<10). This step is analogous to the sixth row of table 400, wherein a swap is not performed for the sixth index of buffer 200. The look ahead capabilities and associated cycle reductions of process 500 are demonstrated in part by the "skipping" of index 0100 that occurs here.

While not shown explicitly in FIG. 5B, it can be inferred that, during the twelfth clock cycle of process 500 (similar to the fourth clock cycle), if swap enable 226 is set to 1, processor 210 is configured to store the value in reverse register 229 in buffer 200 at forward index 222. In this case, swap enable 226 is indeed set to 1, so processor 210 stores the value 27 in register 229 to memory at index 222 (0011) of buffer 200. Concurrently, processor 210 is configured to increment index 224, generate index 225 based on index 224, and update swap enable 227 accordingly if swap enable 227 is set to 0. In this case, swap enable 227 is still set to 1, so processor 210 does not make any updates to these registers.

It can also be inferred that, during the thirteenth clock cycle of process 500, processor 210 completes the swap between index 0011 and index 1100 of buffer 200. Moreover, in the fourteenth through seventeenth clock cycles, it can be inferred that processor completes a swap between index 0101 and index 1010 of buffer 200. It can also be inferred that processor 210 looks ahead and skips index 0110 in parallel to executing the load and store instructions required to complete the swap between index 0101 and index 1010.

During the eighteenth clock cycle of process 500, it can be inferred that processor 210 loads the value in buffer 200 at index 0111 (62) in parallel to setting the look ahead index (in this case, index 222) to 1000 and accordingly setting swap enable 226 bit to 0 (thereby skipping memory accesses associated with index 1000). Moreover, processor 210 skips indices 1001 and 1010 during the nineteenth and twentieth clock cycles before loading the value in buffer 200 at index 1011 during the twenty-second clock cycle. Process 500, as described in this example, ends during the twenty-fifth clock cycle as processor 210 completes the swap between indices 1011 and 1101 while concurrently determining that the look ahead index (in this case, index 224) has reached the same value as max index 230. Accordingly, outside of the initialization step performed during the first clock cycle, process 500 reverses the data in buffer 200 in just 24 clock cycles.

While the example described above relates to an embodiment where buffer 200 holds 16 values, it will be appreciated that the methods described herein apply to buffer of various sizes. For example, buffer 200 could also hold 32 values ($2^5$) or 64 values ($2^6$). For these larger size buffers, process 500 may experience some cycle penalties assuming that processor 210 is a dual-issue processor. For example, as shown in table 400, at most three consecutive indices (1000, 1001, 1010) do not require swapping (excluding the max index 1111) for a buffer size 16, so no cycle penalties occur. However, it will be appreciated that process 500 can still handle larger buffer sizes with only a limited number of cycle penalties.

Turning now to FIG. 6, an example table 600 that compares process 500 to previous approaches is shown, according to some embodiments. Table 600 shows a number of clock cycles required to complete an in-place bit reversal for buffers of size 16 ($2^4$) to 4096 ($2^{12}$). The data in table 600 under the "present methodology clock cycles" column assumes that processor 210 is a dual-issue processor. Some of the cycle reductions shown in table 600 can be realized through the use of max index 230 as described above. As shown, consistent with the example described above, for a buffer size 16, process 500 completes the in-place bit reversal in just 24 clock cycles. When compared to previous approaches, process 500 achieves a speedup factor of about 1.95. These previous approaches typically involve pipelined instruction architectures and wasted clock cycles that result from unnecessary branching instructions when compared to process 500. As buffer size increases, the cycle penalties described above with respect to process 500 can be seen in table 600. However, as buffer size increases, the speedup factor associated with process 500 also increases.

Figure 7:
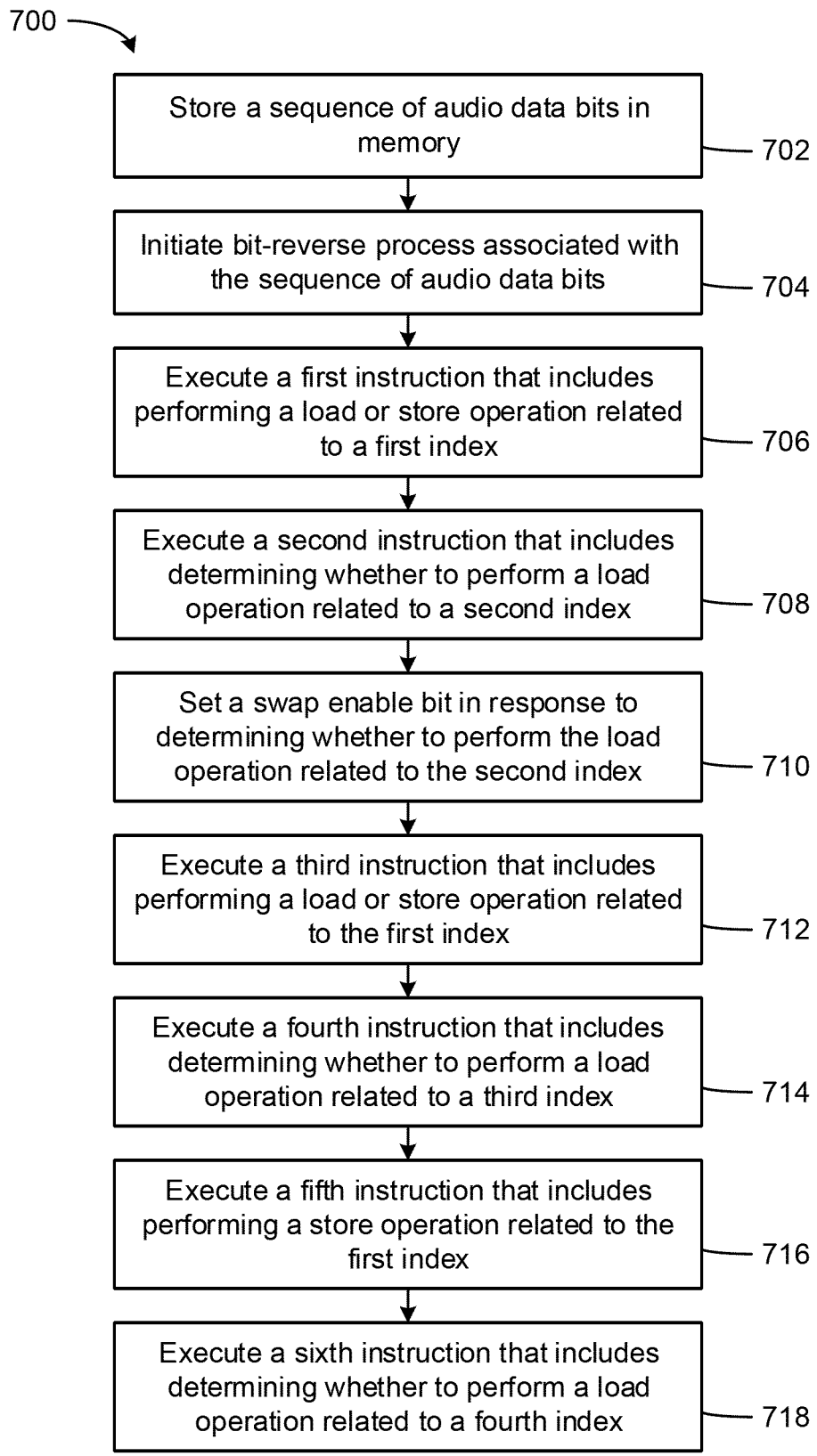
FIG. 7 is a flow diagram of a process for an in-place bit-reverse permutation associated with the method of FIGS. 5A-5B.

Turning now to FIG. 7, a flow diagram of a process 700 for an efficient in-place bit-reversal for audio processing applications is shown, according to some embodiments. Process 700 can be performed by any type of audio processing circuit with a multi-issue processor such as ASIC 202. Process 700 is related to process 500, however process 700 provides more of a general overview of the methodology described herein. In some embodiments, process 700 is performed by a dual-issue processor with a single load-store unit. However, it will be appreciated that process 700 can be adapted for various hardware environments in order to minimize processing power and memory usage associated with an in-place bit-reversal.

Process 700 is shown to include storing a sequence of audio data bits in memory (step 702). Process 700 is also shown to include initiating a bit-reverse process associated with the sequence of audio data bits stored in memory (step 704). For example, processor 210 can be configured to initiate process 500 in response to a determination that the audio data bits in buffer 200 need to be rearranged in bit-reverse order. An example of buffer 200 before and after such a bit-reversal is shown above in FIG. 3. In some embodiments, the bit-reverse process is initiated by initializing indices 222 and 223 as well as swap enable 226 during a first clock cycle and subsequently setting indices 224 and 225 and setting swap enable 227 during a second clock cycle. Max index 230 as well as FFT/IFFT length 231 can also be determined as part of the initiation of the bit-reverse process.

Process 700 is also shown to include executing a first instruction that includes performing a load or store operation related to a first index (step 706). By way of example, consider again that buffer 200 holds sixteen values each represented by a four bit index. In this example, also consider that step 706 includes loading the value in buffer 200 at index 0111 into forward value register 228. Referring to the example of buffer 200 shown in FIG. 3, this means that processor 210 loads the value 62 into register 228. It will be appreciated that in this example, step 706 may not be the first load instruction executed during the bit-reverse process, however index 0111 provides an example of the look ahead capabilities associated with the methodology described herein.

Process 700 is also shown to include executing a second instruction that includes determining whether to perform a load operation related to a second index (step 708). Step 708 can be executed concurrently with step 706. Continuing with the above example, the forward index (e.g., index 224) may be set to 0111 and used by processor 210 during the load instruction executed in step 706. Accordingly, the look ahead index (e.g., index 224) may be set to 1000 (0111+1) and its bit-reverse counterpart (e.g., index 225) may be set to 0001 in step 708. Processor 210 can be configured to compare a value associated with the look ahead index and its bit-reverse counterpart and set a swap enable (e.g., swap enable 227) accordingly. In this case, processor 210 can determine that the value 8 associated with index 1000 is greater than the value 1 associated with index 0001 and can set the swap enable to 0 (step 710). Accordingly, processor 210 can determine that a load operation should not be performed for index 1000.

Process 700 is also shown to include executing a third instruction that includes performing a load or store operation related to the first index (step 712). Continuing with the above example, processor 210 can be configured to load the value at index 1110 (the bit-reverse counterpart of the first index 0111) into reverse value register 229. Referring again to the example of buffer 200 shown in FIG. 3, processor 210 can load the value 38 into register 229. Concurrently, processor 210 can be configured to execute a fourth instruction that includes determining whether to perform a load operation related to a third index (step 714). In this case, processor 210 can be configured to increment the look ahead index to 1001, generate the bit-reverse counterpart of the look ahead index (also 1001), and determine if a load operation should be performed for the look ahead index 1001. In this case, since the look ahead index is equal to its bit-reverse counterpart, processor 210 can determine that a load operation should not be performed for index 1001 and can again set the swap enable to 0.

Process 700 is also shown to include executing a fifth instruction that includes performing a store operation related to the first index (step 716). Still continuing with the above example, processor 210 can be configured to store the value in reverse register 229 in buffer 200 at the forward index 0111. Meanwhile, concurrently, processor 210 can be configured to execute a sixth instruction that includes determining whether to perform a load operation related to a fourth index (step 718). In this case, processor 210 can again be configured to increment the look ahead index to 1010, generate the bit-reverse counterpart of the look ahead index (0101), and determine if a load operation should be performed for the look ahead index. In this case, the look ahead index is greater than its bit-reverse counterpart (10>5), so processor 210 can determine that a load operation should not be performed for index 1010 and can accordingly set the swap enable to 0.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A digital audio signal processing integrated circuit, the integrated circuit comprising:
    a multi-issue processor configured to execute multiple instructions concurrently and connectable to a memory having a plurality of memory locations, each memory location represented by a corresponding index;
    when connected to the memory, the processor configured to perform a bit-reverse operation on a sequence of audio data bits stored in the plurality of memory locations by:
        executing a first instruction that configures the processor to perform a load or store operation related to a first index; and
        executing a second instruction that configures the processor to determine whether to perform a load operation related to a second index;
        wherein the processor executes the first instruction and the second instruction concurrently.

2. The integrated circuit of claim 1, further comprising the memory having the plurality of memory locations, each memory locations represented by a corresponding index.

3. The integrated circuit of claim 1, wherein the second instruction configures the processor to calculate a bit-reverse counterpart of the second index.

4. The integrated circuit of claim 3, wherein the second instruction configures the processor to determine whether to perform the load operation related to the second index by comparing a value of the second index to a value of the bit-reverse counterpart of the second index.

5. The integrated circuit of claim 4, wherein the second instruction configures the processor to perform the load operation related to the second index in response to a determination that the value of the second index is less than the value of the bit-reverse counterpart of the second index.

6. The integrated circuit of claim 1, wherein the second instruction configures the processor to set a swap enable in response to determining whether to perform the load operation related to the second index.

7. The integrated circuit of claim 1, wherein the integrated circuit is configured to store the sequence of audio data bits in the memory based on data received from an acoustic transducer based on acoustic activity sensed by the acoustic transducer.

8. The integrated circuit of claim 1, wherein the processor is further configured to:
execute a third instruction that configures the processor to perform a load or store operation related to the first index; and
execute a fourth instruction that configures the processor to determine whether to perform a load operation related to a third index;
wherein the processor executes the third instruction and the fourth instruction concurrently.

9. The integrated circuit of claim 8, wherein the processor is further configured to:
execute a fifth instruction that configures the processor to perform a store operation related to the first index; and
execute a sixth instruction that configures the processor to determine whether to perform a load operation related to a fourth index;
wherein the processor executes the fifth instruction and the sixth instruction concurrently.

10. A method for processing an audio signal using an integrated circuit comprising a memory and a multi-issue processor, the memory having a plurality of memory locations, each memory location represented by a corresponding index, the processor configured to execute multiple instructions concurrently, the method comprising:
storing, in the memory, a sequence of audio data bits; and
performing, using the processor, a bit-reverse operation on the sequence of audio data bits stored in the memory, performing the bit-reverse method comprising:
executing a first instruction that configures the processor to perform a load or store operation related to a first index; and
executing a second instruction that configures the processor to determine whether to perform a load operation related to a second index;
wherein the processor executes the first instruction and the second instruction concurrently.

11. The method of claim 10, wherein executing the second instruction comprises calculating a bit-reverse counterpart of the second index.

12. The method of claim 11, wherein executing the second instruction comprises determining whether to perform the load operation related to the second index by comparing a value of the second index to a value of the bit-reverse counterpart of the second index.

13. The method of claim 12, wherein executing the second instruction comprises determining to perform the load operation related to the second index in response to determining that the value of the second index is greater than the value of the bit-reverse counterpart of the second index.

14. The method of claim 10, wherein executing the second instruction comprises setting a swap enable in response to determining whether to perform the load operation related to the second index.

15. The method of claim 10, further comprising receiving a signal from which the sequence of audio data bits is determined from an acoustic transducer configured to generate the signal based on acoustic activity sensed by the acoustic transducer.

16. The method of claim 10, wherein performing the bit-reverse operation further comprises:
executing a third instruction that configures the processor to perform a load or store operation related to the first index; and
executing a fourth instruction that configures the processor to determine whether to perform a load operation related to a third index;
wherein the processor executes the third instruction and the fourth instruction concurrently.

17. The method of claim 16, wherein performing the bit-reverse operation further comprises:
execute a fifth instruction that configures the processor to perform a store operation related to the first index; and
execute a sixth instruction that that configures the processor to determine whether to perform a load operation related to a fourth index;
wherein the processor executes the fifth instruction and the sixth instruction concurrently.

18. A microphone assembly comprising:
an acoustic transducer configured to sense acoustic activity and generate an electrical signal representative of the acoustic activity; and
an integrated circuit comprising:
a memory having a plurality of memory locations, each memory location represented by a corresponding index, the integrated circuit configured to store a sequence of audio data bits based on the electrical signal representative of the acoustic activity in the plurality of memory locations; and
a multi-issue processor configured to execute multiple instructions concurrently, wherein the processor is configured to perform a bit-reverse operation on the sequence of audio data bits by:
performing a load or store operation related to a first index; and
determining whether to perform a load operation related to a second index,
wherein the performing the load or store operation and the determining whether to perform the load operation occurs concurrently.

19. The microphone assembly of claim 18, wherein the processor is configured to calculate a bit-reverse counterpart of the second index.

20. The microphone assembly of claim 18, wherein the processor is configured to set a swap enable in response to determining whether to perform the load operation related to the second index.

* * * * *